(12) United States Patent
Xiao et al.

(10) Patent No.: US 9,787,381 B2
(45) Date of Patent: Oct. 10, 2017

(54) SIGNAL SEQUENCE ESTIMATION (71) Applicant: EMPIRE TECHNOLOGY DEVELOPMENT LLC, Wilmington, DE (US)

(72) Inventors: Yue Xiao, Sichuan (CN); Zongfei Yang, Sichuan (CN); Ping Yang, Sichuan (CN); Jun Fang, Shaanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/296,206

(22) Filed: Oct. 18, 2016

(65) Prior Publication Data

US 2017/0041048 A1 Feb. 9, 2017

Related U.S. Application Data

(63) Continuation of application No. 14/390,629, filed as application No. PCT/CN2013/085288 on Oct. 16, 2013, now Pat. No. 9,515,710.

(51) Int. Cl.
*H04B 7/04* (2017.01)
*H04L 25/03* (2006.01)
(Continued)

(52) U.S. Cl.
CPC ............ *H04B 7/046* (2013.01); *H04B 7/0456* (2013.01); *H04B 7/0697* (2013.01);
(Continued)

(58) Field of Classification Search
CPC .............. H04B 7/04; H04B 7/06; H04L 25/03
See application file for complete search history.

(56) References Cited

U.S. PATENT DOCUMENTS 8,391,322 B2  3/2013  Kent et al.
8,401,591 B2  3/2013  Catreux-Erceg et al.
(Continued)

FOREIGN PATENT DOCUMENTS

CN      1703034 A    11/2005
CN    102111205 A     6/2011
(Continued)

OTHER PUBLICATIONS

Fu, J.,et al., "Generalised spatial modulation with multiple active transmit antennas," 2010 IEEE GLOBECOM Workshops (GC Wkshps), pp. 839-844 (Sep. 2010).
(Continued)

*Primary Examiner* — Jaison Joseph
(74) *Attorney, Agent, or Firm* — Brundidge & Stanger, P.C.

(57) ABSTRACT

In a spatial modulation multiple-input-multiple-output (SM-MIMO) wireless communication system, multiple transmitting antennae and multiple receiving antennae may be utilized to respectively transmit and receive wireless signals for the communication. A selection of a combination of the multiple transmitting antennae may be configured to represent one or more binary digits in a signal sequence. The signal sequence may be produced at the receiving end without the knowledge of the selection of the combination of the multiple transmitting antennae.

20 Claims, 4 Drawing Sheets

(51) Int. Cl.
  *H04B 7/0456* (2017.01)
  *H04B 7/06* (2006.01)
  *H04L 27/00* (2006.01)
(52) U.S. Cl.
  CPC .. *H04L 25/03178* (2013.01); *H04L 25/03203* (2013.01); *H04L 25/03968* (2013.01); *H04L 27/0008* (2013.01)

(56) References Cited

U.S. PATENT DOCUMENTS

| | | | |
|---|---|---|---|
| 8,411,794 B2* | 4/2013 | Uhl | H04B 7/10 375/299 |
| 8,422,595 B2 | 4/2013 | Jiang | |
| 8,432,994 B2* | 4/2013 | Hou | H04B 7/0413 375/267 |
| 8,799,751 B2 | 8/2014 | Shabany et al. | |
| 9,049,676 B2* | 6/2015 | Haas | H04W 52/42 |
| 2008/0037673 A1 | 2/2008 | Ahn et al. | |
| 2012/0014483 A1 | 1/2012 | Shabany et al. | |

FOREIGN PATENT DOCUMENTS

| | | |
|---|---|---|
| CN | 103281265 A | 9/2013 |
| EP | 2169888 A1 | 3/2010 |
| EP | 2309689 A1 | 4/2011 |

OTHER PUBLICATIONS

International Search Report and Written Opinion for counterpart International Patent Application No. PCT/CN2013/085288 mailed Jun. 30, 2014.
Ma, N., et al., "Adaptive Joint Mapping Generalised Spatial Modulation," 2012 1st IEEE International Conference on Communications in China (ICCC), pp. 579-582 (Oct. 2012).
Mesleh, R.Y., "Spatial modulation," IEEE Trans. Veh. Technol, vol. 57, No. 4, pp. 2228-2241 (Jul. 2008).
Rusek, F., et al., "Scaling up MIMO: Opportunities and Challenges with Very Large Arrays," Accepted for publication in the IEEE Signal Processing Magazine, pp. 40-60 (Mar. 2013).
Wang, J., et al., "Generalised spatial modulation system with multiple active transmit antennas and low complexity detection scheme," IEEE Transactions on Wireless Communications, vol. 11, No. 4, pp. 1605-1615 (Sep. 2012).
Wu, D., et al., "Evaluation of MIMO Symbol Detectors for 3GPP LTE Terminals" Proceedings of the 17th European Signal Processing Conference (EUSIPCO'09), pp. 2431-2435 (Aug. 24-28, 2009).
Younis, A., et al., "Generalised spatial modulation," 2010 Conference Record of the Forty Fourth Asilomar Conference on Signals, Systems and Computers (Asilomar), pp. 1498-1502 (Nov. 2010).
Extended European Search Report for European Application No. EP 13895597.6 dated May 29, 2017, pp. 9.

* cited by examiner

SIGNAL SEQUENCE ESTIMATION

CROSS-REFERENCE TO RELATED APPLICATIONS

This application is a Continuation application under 35 U.S.C. §120 of U.S. patent application Ser. No. 14/390,629, filed on Oct. 3, 2014, now U.S. Pat. No. 9,515,710, which is the U.S. National Stage filing under 35 U.S.C. §371 of International Application No. PCT/CN2013/085288, filed on Oct. 16, 2013. The disclosures of both applications are hereby incorporated herein by reference in their entireties.

TECHNICAL FIELD

The technologies described herein pertain generally to signal sequence estimation in a multiple-input-multiple-output (MIMO) wireless communication system.

BACKGROUND

Unless otherwise indicated herein, the approaches described in this section are not prior art to the claims in this application and are not admitted to be prior art by inclusion in this section.

In a spatial modulation multiple-input-multiple-output (SM-MIMO) wireless communication system, multiple transmitting antennae and multiple receiving antennae may be utilized to respectively transmit and receive wireless signals to facilitate communications. A selection of a combination of the multiple transmitting antennae may be configured to represent one or more binary digits in a signal sequence.

SUMMARY

Technologies are generally described for signal sequence estimation. The various techniques described herein may be implemented in various methods, systems, computer-readable mediums, and/or other computer-programmable products.

In some examples, various embodiments may be implemented as methods. Some methods may include identifying multiple combinations of one or more transmitting antennae; receiving one or more wireless signals transmitted by one of the identified combinations of the one or more transmitting antennae; generating multiple groups of symbols that respectively correspond to one of the identified combinations of the one or more transmitting antennae; calculating a value for each of the multiple groups of symbols; selecting, from the multiple groups of symbols, the group of symbols having the lowest calculated value; and producing the one or more signal sequences based on the selected group of symbols in accordance with a predetermined mapping table.

In some examples, various embodiments may be implemented as systems. Some systems may include multiple transmitting antennae; a modulation module configured to identify one or more signal sequences, map at least a portion of the one or more signal sequences to one of multiple combinations of the multiple transmitting antennae, in accordance with a predetermined mapping table, map other portions of the one or more signal sequences to one or more modulation symbols, in accordance with the predetermined mapping table, and activate the one of the multiple combinations of the multiple transmitting antennae to transmit the one or more modulation symbols; one or more receiving antennae configured to receive one or more wireless signals that carry the one or more modulation symbols; and a demodulation module configured to generate multiple groups of symbols that respectively correspond to one of the multiple combinations of the multiple transmitting antennae, calculate a value for each of the multiple groups of symbols, select, from the multiple groups of symbols, the group of symbols having the lowest calculated value, and produce the one or more signal sequences based on the selected group of symbols in accordance with the predetermined mapping table.

Some other systems may include one or more receiving antennae configured to receive one or more wireless signals that carry one or more modulation symbols; and a demodulation module configured to generate multiple groups of symbols that respectively correspond to one of multiple combinations of multiple transmitting antennae, calculate a value for each of the multiple groups of symbols, select, from the multiple groups of symbols, the group of symbols having the lowest calculated value, and produce one or more signal sequences based on the selected group of symbols in accordance with a predetermined mapping table.

In some examples, various embodiments may be implemented as computer-readable mediums having executable instructions stored thereon. Some computer-readable mediums may store instructions that, when executed, cause one or more processors to perform operations including receiving one or more wireless signals transmitted by one of multiple combinations of one or more transmitting antennae, each of which includes an equal number of transmitting antennae; generating multiple groups of symbols that respectively corresponds to one of the multiple combinations of the one or more transmitting antennae; calculating a value for each of the multiple groups of symbols; selecting, from the multiple groups of symbols, the group of symbols having the lowest calculated value; and generating the one or more signal sequences based on the selected group of symbols in accordance with a predetermined mapping table.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
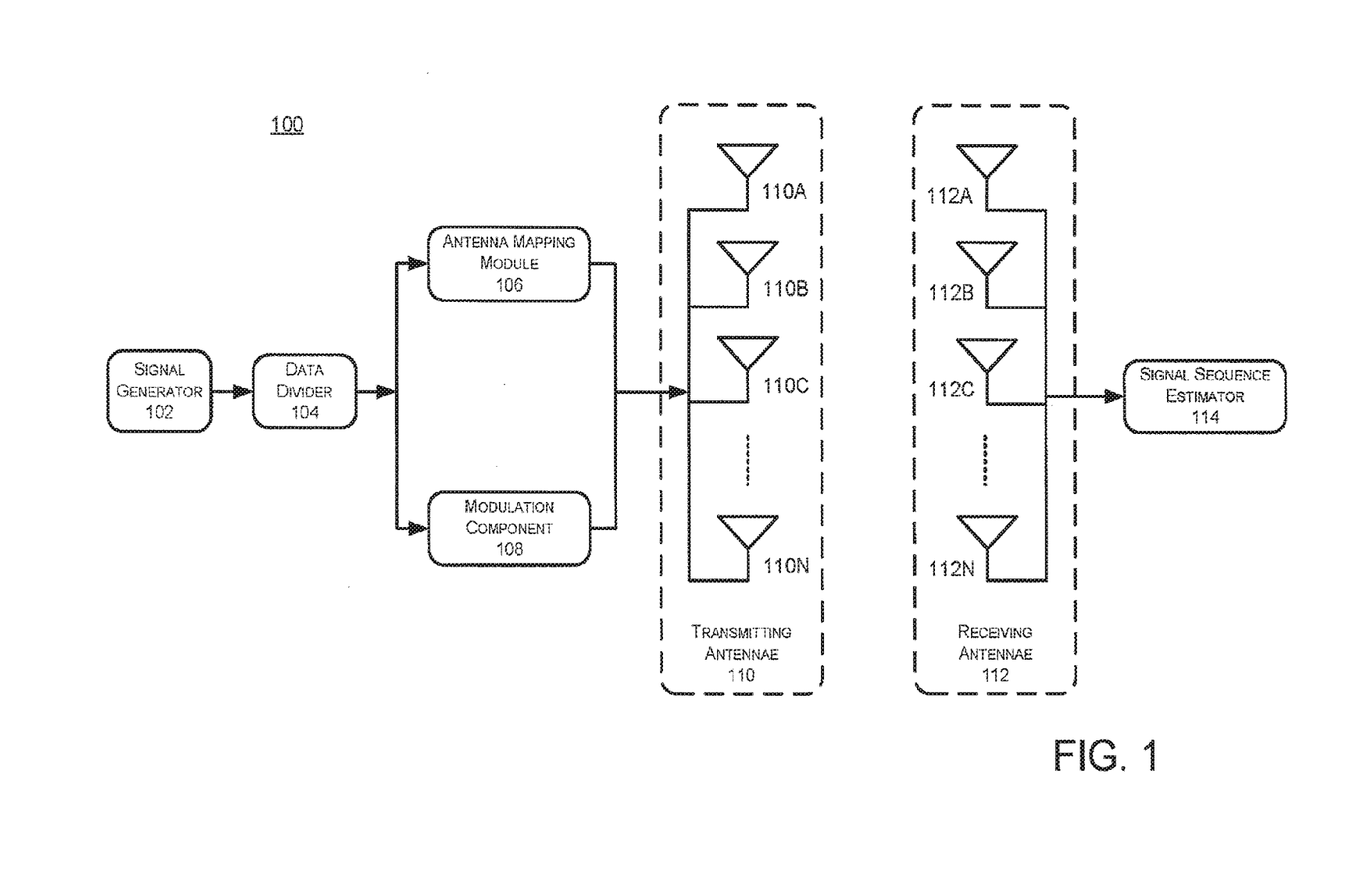
FIG. 1 shows an example system in which signal sequence estimation may be implemented.

FIG. 1 shows an example SM-MIMO wireless communication system 100 in which signal sequence estimation may be implemented, arranged in accordance with at least some embodiments described herein. As depicted, example system 100 may include, at least, a signal generator 102, a data divider 104, an antenna mapping module 106, a modulation component 108, multiple transmitting antennae 110A, 110B, 110C, . . . , 110N; multiple receiving antennae 112A, 112B, 112C, . . . , 112N, and a signal sequence estimator 114. Unless context requires specific reference to one or more of transmitting antennae 110A, 110B, 110C, . . . , 110N, collective reference may be made to "transmitting antennae 110" below. Similarly, unless context requires specific reference to one or more of receiving antennae 112A, 112B, 112C, . . . , 112N, collective reference may be made to "receiving antennae 112" below.

Signal generator 102 may refer to a component configured to generate multiple signal sequences that respectively include multiple binary digits, e.g., 101001. In accordance with various embodiments, signal generator 102 may be implemented as hardware, firmware, software, or any combination thereof. The binary digits may then be transmitted to data divider 104.

Data divider 104 may refer to a component that is communicatively coupled to signal generator 102 and that is configured to divide the binary digits received from signal generator 102 into different portions in accordance with at least one of the number of transmitting antennae 110 and a modulation scheme adopted by system 100. For example, when system 100 includes, e.g., four transmitting antennae, from which system 100 chooses two antennae to transmit one or more symbols, and adopts a Quadrature Phase Shift Keying (4-PSK) scheme, data divider 104 may divide the received binary digits into different portions, each of which may include, e.g., six binary digits. In accordance with various embodiments, data divider 104 may be implemented as hardware, firmware, software, or any combination thereof.

Antenna mapping module 106 may refer to a component configured to select, from data divider 104, one or more binary digits from each divided portion of the signal sequences, and map the selected binary digits to one of multiple combinations of transmitting antennae 110. In some examples, the multiple combinations of transmitting antennae 110 may be a subset of all possible combinations of two of transmitting antennae 110. For example, in a wireless communication system that includes four transmitting antennae, namely, transmitting antenna 110A, 110B, 110C, and 110D, the multiple combinations may only refer to four combinations of the total six possible combinations of two of the transmitting antennae, e.g., the combinations of antennae 110A and 110C, antennae 110B and 110D, antennae 110A and 110D, and antennae 110B and 110C. Further to the example, antenna mapping module 106 may select two binary digits from each divided portion of the signal sequences to map to one of the four combinations. In a non-limiting example, such mapping relationship may be shown in a part of a predetermined mapping table as shown below. The predetermined mapping table may be known to antenna mapping module 106 and modulation component 108 at the transmitting end of example system 100 and signal sequence estimator 114 at the receiving end thereof. The combination of antennae that corresponds to the two binary digits may be configured to transmit wireless signals when other antennae of transmitting antennae 110 are not selected. In accordance with various embodiments, antenna mapping module 106 may be implemented as hardware, firmware, software, or any combination thereof.

| Binary digits | Antennae combination | Modulation symbols |
|---|---|---|
| 00 | (110A, 110C) | $S_0 = -1 - i$ |
| 01 | (110B, 110D) | $S_1 = -1 + i$ |
| 10 | (110A, 110D) | $S_2 = 1 - i$ |
| 11 | (110B, 110C) | $S_3 = 1 + i$ |

In a non-limiting example, when the portion of binary digits is 101001, the first two digits, i.e., 10, may be selected to map to one of the multiple combinations of transmitting antennae 110. In accordance with the predetermined mapping table, the combination of antennae 110A and 110B may then be selected to transmit the remaining portion of binary digits, i.e., 1001.

Modulation component 108 may refer to a component that may be configured to modulate the remaining portion of binary digits, i.e., 1001, in accordance with a modulation scheme adopted by the wireless communication system, e.g., 4-PSK. That is, modulation component 108 may be configured to map the remaining portion of binary digits to one or more modulation symbols in accordance with the predetermined mapping table. A modulation symbol may refer to a waveform that persists for a fixed period of time and represents a number of binary digits. Further to the aforementioned non-limiting example, when the portion of binary digits is 101001, the last four binary digits, i.e., 1001, may be mapped to two modulation symbols respectively. That is, 10 may be mapped to symbol $S_2$ and 01 may be mapped to symbol $S_1$. Thus, modulation symbols $S_2$ and $S_1$ may be transmitted by the combination of antennae 110A and 110D as identified above. More specifically, $S_2$ may be transmitted by antenna 110A, and $S_1$ may be transmitted by antenna 110D. In accordance with various embodiments, modulation component 108 may be implemented as hardware, firmware, software, or any combination thereof.

Transmitting antennae 110 may refer to multiple antennae configured to convert one or more modulation symbols into corresponding wireless signals in the form of electromagnetic waves and further transmit the wireless signals.

Receiving antennae 112 may refer to multiple antennae configured to receive the electromagnetic waves that carry the wireless signals and relay the wireless signals to signal sequence estimator 114.

Signal sequence estimator 114 may refer to a component that may be configured to generate multiple groups of symbols based on the multiple combinations of transmitting antennae 110, select one from the multiple groups of symbols, and produce the signal sequences based on the selected group of symbols in accordance with the predetermined mapping table. In various embodiments, signal sequence estimator 114 may be implemented as hardware, firmware, software, or any combination thereof.

That is, signal sequence estimator 114 may be configured to identify the multiple combinations of transmitting antennae 110 in accordance with the predetermined mapping table. As described above, in at least some examples, the multiple combinations of transmitting antennae 110 may be a subset of all possible combinations of transmitting antennae 110. Since the transmitted wireless signals do not contain any information that identifies the combination of transmitting antennae 110 that actually transmitted the wireless signals, signal sequence estimator 114 may be configured to generate multiple groups of symbols based on each of the multiple combinations of transmitting antennae 110. The process of generating the multiple groups of symbols is described further with respect to FIG. 2.

Further, signal sequence estimator 114 may be configured to calculate a value for each of the multiple groups of symbols. In at least some examples, the calculated value may be a Euclidean distance value or other types of distance values. Thus, signal sequence estimator 114 may be configured to select one group of symbols having the lowest calculated value from the multiple groups of symbols and to produce the signal sequence based on the selected group of symbols in accordance with the predetermined mapping table. The process of producing the signal sequence is described further with respect to FIG. 2. Thus, example system 100 describes an SM-MIMO wireless communication system that may modulate the signal sequences with different combinations of transmitting antennae 110 and may estimate the signal sequences at the receiving end.

Figure 2:
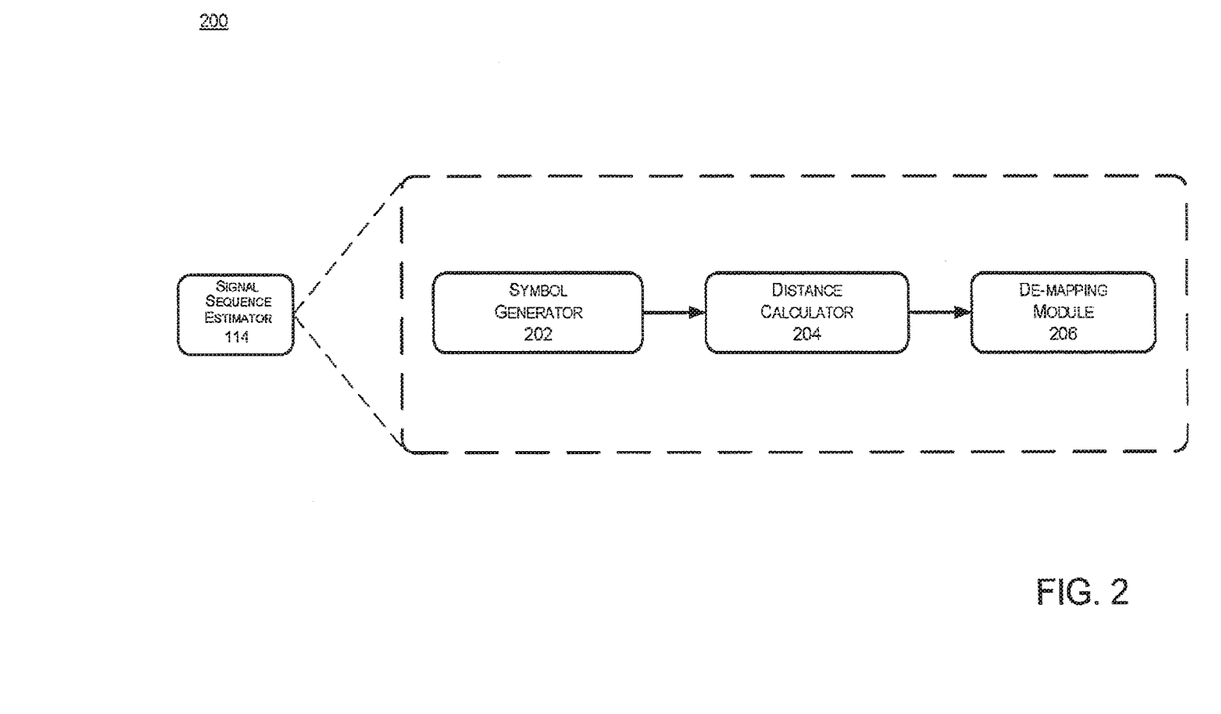
FIG. 2 shows an example configuration of an example signal estimator by which signal sequence estimation may be implemented.

FIG. 2 shows an example configuration of a signal estimator 114 by which signal sequence estimation in an SM-MIMO wireless communication system may be implemented, arranged in accordance with at least some embodiments described herein. As depicted, signal estimator 114, described above with regard to FIG. 1, may include at least a symbol generator 202, a distance calculator 204, and a de-mapping module 206.

Symbol generator 202 may refer to a component that may be configured to generate multiple groups of symbols that respectively correspond to one of the identified combinations of transmitting antennae 110 based on the condition of wireless channels and the received wireless signals. In some examples, the multiple groups of symbols may be generated in accordance with the formula $$\tilde{x}^k = Q(((h^k)^H h^k + \sigma^2 I)^{-1}(h^k)^H y).$$

In such formula, $\tilde{x}^k$ represents a group of symbols that corresponds to one of the identified combinations of transmitting antennae 110, Q represents one of the currently existing constellation demodulation functions, $h^k$ represents a portion of a channel matrix that corresponds to the combination of transmitting antennae 110, $\sigma^2$ represents the variance of noise interference between transmitting antennae 110 and receiving antennae 112, I represents an identity matrix, y represents the received wireless signals, and the superscript H represents a conjugate transposition of the matrix. In accordance with various embodiments, symbol generator 202 may be implemented as hardware, firmware, software, or any combination thereof.

In a non-limiting example, symbol generator 202 may be configured to generate a group of symbols that corresponds to the first combination of transmitting antennae 110 as identified in the aforementioned predetermined mapping table, namely, antennae 110A and 110C. Assuming the output of function Q is $$\begin{pmatrix} S_2 = 1-i \\ S_1 = -1+i \end{pmatrix},$$

the generated symbols for the first combination of transmitting antennae 110 may then be $\tilde{x}^1=(S_2=1-i,0,S_1=-1+i,0)^T$, the superscript T represents a transposition of the matrix. That is, it is estimated that antenna 110A transmitted the symbol $S_2$, antenna 110C transmitted the symbol $S_1$, and nothing was transmitted via antennae 110B or 110D. Symbols that correspond to other combinations of transmitting antennae 110 may be similarly generated.

Distance calculator 204 may refer to a component that may be configured to calculate a value, e.g., a Euclidean distance value, for each of the generated groups of symbols. The Euclidean distance value may be calculated in accordance with $\|y-H\tilde{x}^k\|$, in which H represents the aforementioned channel matrix. Further, distance calculator 204 may be configured to select one group of symbols that has a lowest distance value. In some examples, the selected group of symbols may be represented as $\hat{x}=\arg\min_k \|y-H\tilde{x}^k\|$. In accordance with various embodiments, distance calculator 204 may be implemented as hardware, firmware, software, or any combination thereof.

De-mapping module 206 may refer to a component that may be configured to produce the signal sequences based on the selected group of symbols in accordance with the predetermined mapping table. In a non-limiting example, assuming $\tilde{x}^1$ is selected as the group of symbols that have a lowest Euclidean distance value, de-mapping module 206 may determine that the first two binary digits of the signal sequence is 00 since $\tilde{x}^1$ indicates the first combination of transmitting antennae 110. Further, since $\tilde{x}^1$ includes $S_2=1-i$ and $S_1=-1+i$, de-mapping module 206 may determine the next four binary digits are 1001 in accordance with the predetermined mapping table. Thus, de-mapping module 206 may be configured to produce the original signal sequence, 101001, as generated by signal generator 102.

Thus, example configuration 200 of signal sequence estimator 114 may produce the original signal sequence from the wireless signals received by receiving antennae 112.

Figure 3:
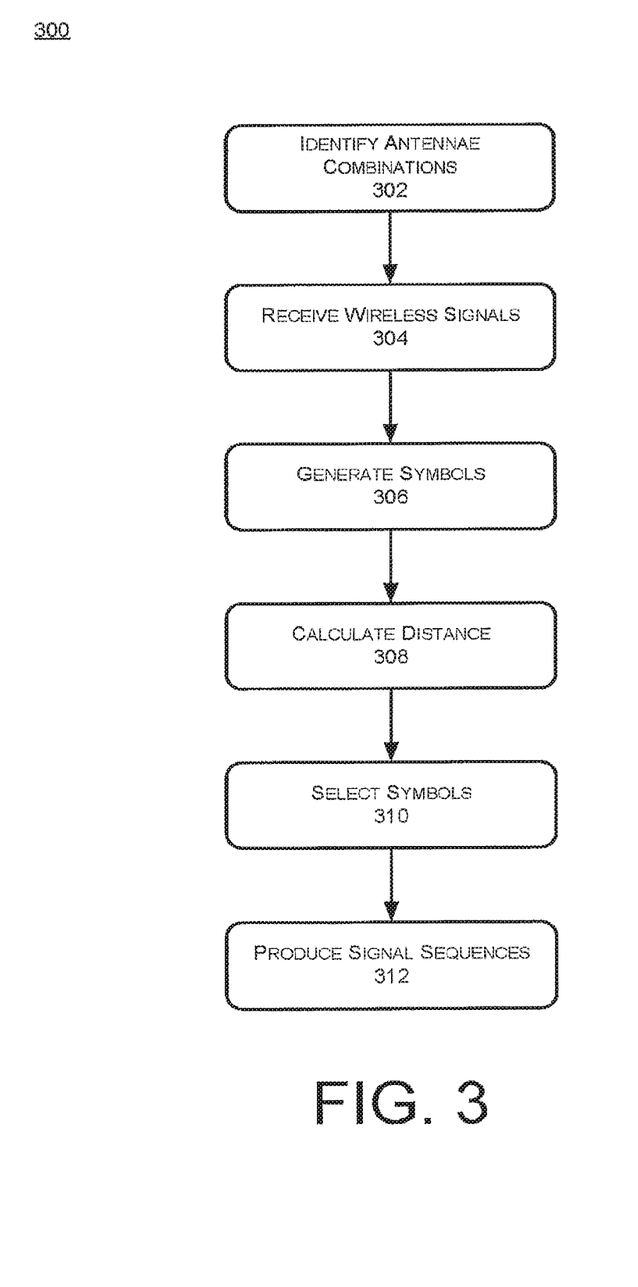
FIG. 3 shows an example configuration of a processing flow of operations by which signal sequence estimation may be implemented.

FIG. 3 shows an example configuration 300 of a processing flow of operations by which signal sequence estimation in an SM-MIMO wireless communication system may be implemented, arranged in accordance with at least some embodiments described herein. As depicted, processing flow 300 may include sub-processes executed by various components that are part of example system 100. However, processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302, 304, 306, 308, 310, and/or 312. Processing may begin at block 302.

Block 302 (Identify Antennae Combinations) may refer to symbol generator 202 identifying the multiple combinations of transmitting antennae 110 in accordance with the predetermined mapping table. As described above, in at least some examples, the multiple combinations of transmitting antennae 110 may be a subset of all possible combinations of transmitting antennae 110. For example, in a wireless communication system that includes four transmitting antennae, namely, antenna 110A, 110B, 110C, and 110D, the multiple combinations may refer to only four combinations of the total six possible combinations of two of the transmitting antennae, e.g., the combinations of antennae 1 and 3, antennae 2 and 4, antennae 1 and 4, and antennae 2 and 3. Block 302 may be followed by block 304.

Block 304 (Receive Wireless Signals) may refer to receiving antennae 112 receiving the electromagnetic waves that carry the wireless signals and relay the wireless signals to signal sequence estimator 114. Block 304 may be followed by block 306.

Block 306 (Generate Symbols) may refer to symbol generator 202 generating multiple groups of symbols that respectively correspond to one of the identified combinations of transmitting antennae 110 in accordance with the aforementioned formula $$\tilde{x}^k = Q(((h^k)^H h^k + \sigma^2 I)^{-1} (h^k)^H y).$$

In a non-limiting example, symbol generator 202 may be configured to generate a group of symbols that corresponds to the first combination of transmitting antennae 110 as identified in the aforementioned predetermined mapping table, namely, antennae 110A and 110C. Assuming the output of function Q is $$\begin{pmatrix} S_2 = 1 - i \\ S_1 = -1 + i \end{pmatrix},$$

the generated symbols for the first combination of transmitting antennae 110 may then be $\tilde{x}^1 = (S_2 = 1-i, 0, S_1 = -1+i, 0)^T$. That is, it is estimated that antenna 110A transmitted the symbol $S_2$, antenna 110C transmitted the symbol $S_1$, and nothing was transmitted via antennae 110B and 110D. Symbols that correspond to other combinations of transmitting antennae 110 may be similarly generated. Block 306 may be followed by block 308.

Block 308 (Calculate Distance) may refer to distance calculator 204 calculating a value, e.g., a Euclidean distance value, for each of the generated groups of symbols. The Euclidean distance value may be calculated in accordance with $\|y - H\tilde{x}^k\|$, in which H represents the above mentioned channel matrix. Block 308 may be followed by block 310.

Block 310 (Select Symbols) may refer to distance calculator 204 selecting one group of symbols that have a lowest distance value. In some examples, the selected group of symbols may be represented as $\hat{x} = \arg \min_k \|y - H\tilde{x}^k\|$. Block 310 may be followed by block 312.

Block 312 (Produce Signal Sequences) may refer to de-mapping module 206 producing the signal sequences based on the selected group of symbols in accordance with the predetermined mapping table. In a non-limiting example, assuming $\tilde{x}^1$ is selected as the group of symbols that have a lowest Euclidean distance value, de-mapping module 206 may determine that the first two binary digits of the signal sequence is 00 since $\tilde{x}^1$ indicates the first combination of transmitting antennae 110. Further, since $\tilde{x}^1$ includes $S_2 = 1-i$ and $S_1 = -1+i$, de-mapping module 206 may determine the next four binary digits are 1001 in accordance with the predetermined mapping table. Thus, de-mapping module 206 may be configured to produce the original signal sequence, 101001, as generated by signal generator 102.

Thus, example configuration 300 of the processing flow of operations provides a method for detecting signal sequences at the receiving end of an SM-MIMO system.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
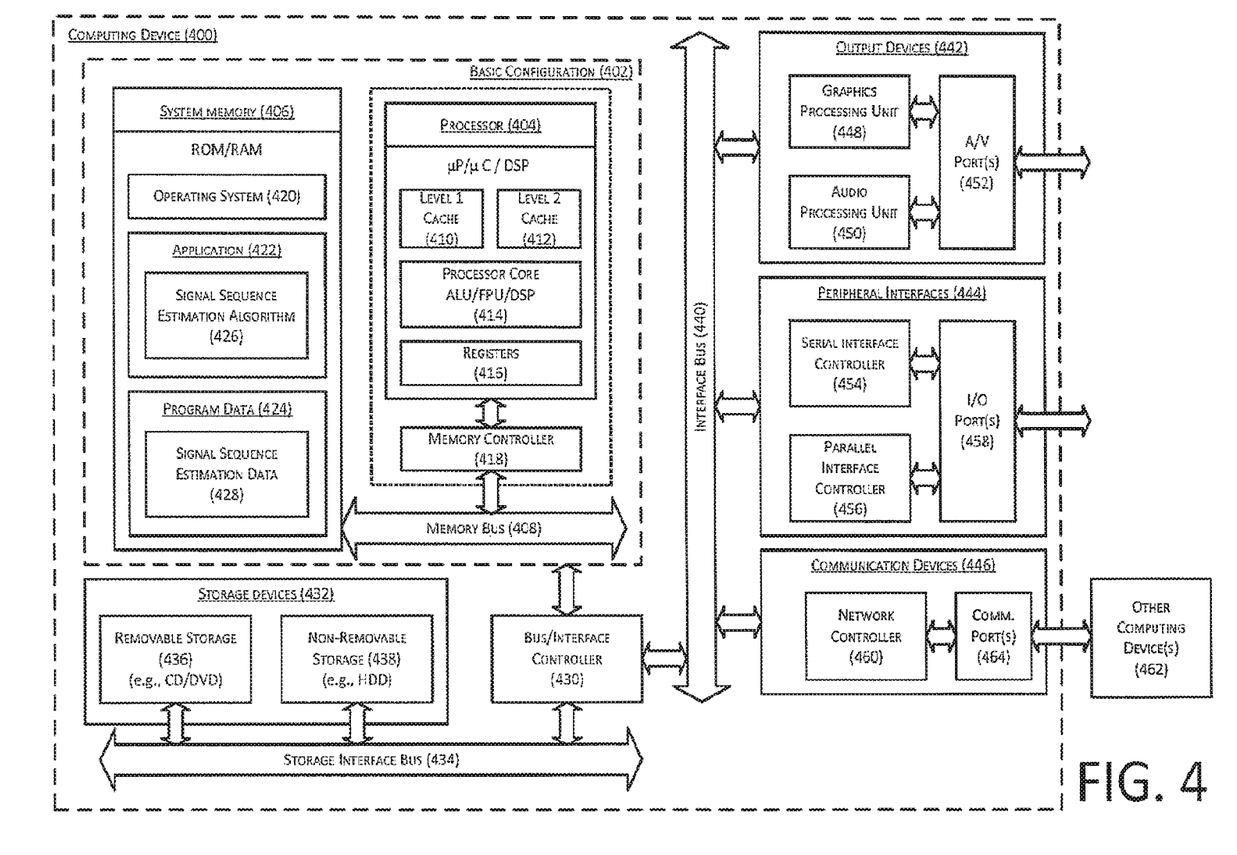
FIG. 4 shows a block diagram illustrating an example computing device that is arranged for signal sequence estimation, all arranged in accordance with at least some embodiments described herein.

FIG. 4 shows a block diagram illustrating an example computing device that is arranged for signal sequence estimation, arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a signal sequence estimation algorithm 426 that is arranged to perform the functions as described herein including those described with respect to FIG. 3. Program data 424 may include signal sequence estimation data 428 that may be useful for operation with signal sequence estimation algorithm 426 as is described herein. In some embodiments, application 422 may be arranged to operate with program data 424 on operating system 420 such that implementations of signal sequence estimation may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to estimate one or more signal sequences, the method comprising:
   generating multiple groups of symbols that respectively correspond to one of combinations of one or more transmitting antennae based on respective wireless channel conditions and one or more wireless signals;
   calculating a distance value for each of the multiple groups of symbols;
   selecting, from the multiple groups of symbols, a group of symbols having the lowest calculated distance value; and
   producing the one or more signal sequences based on the selected group of symbols in accordance with a predetermined mapping table.

2. The method of claim 1, further comprises receiving the one or more wireless signals via one or more receiving antennae.

3. The method of claim 1, wherein the calculated distance value for each of the multiple groups of symbols is a Euclidean distance value.

4. The method of claim 1, further comprising:
   identifying the one or more signal sequences;
   mapping at least a portion of each of the one or more signal sequences to one of the combinations of the one or more transmitting antennae, in accordance with the predetermined mapping table;
   mapping other portions of each of the one or more signal sequences to one or more modulation symbols, in accordance with the predetermined mapping table; and
   transmitting the one or more modulation symbols, via the mapped one of the multiple combinations of the one or more transmitting antennae.

5. The method of claim 1, wherein the generating includes generating each of the multiple groups of symbols as a matrix in accordance with a count of transmitting antennae in each of the multiple combinations of the one or more transmitting antennae.

6. The method of claim 1, wherein each of the multiple combinations of the one or more transmitting antennae includes an equal number of transmitting antennae.

7. The method of claim 1, wherein the multiple combinations of the one or more transmitting antennae are included in a subset of a plurality of combinations of the one or more transmitting antennae.

8. The method of claim 1, wherein the one or more signal sequences respectively include multiple binary digits, and the method further comprises dividing the multiple binary digits into different portions in accordance with a count of the transmitting antennae.

9. A system, comprising:
   a demodulation module configured to:
      generate multiple groups of symbols that respectively correspond to one of multiple combinations of multiple transmitting antennae based on respective wireless channel conditions and one or more wireless signals,
      calculate a distance value for each of the multiple groups of symbols,
      select, from the multiple groups of symbols, a group of symbols having the lowest calculated value, and
      produce one or more signal sequences based on the selected group of symbols in accordance with a predetermined mapping table.

10. The system of claim 9, wherein the calculated distance value for each of the multiple groups of symbols is a Euclidean distance value.

11. The system of claim 9, wherein each of the multiple group of symbols is generated as a matrix in accordance with a count of transmitting antennae in each of the multiple combinations of the multiple transmitting antennae.

12. The system of claim 9, wherein each of the multiple combinations of the multiple transmitting antennae includes an equal number of transmitting antennae.

13. The system of claim 9, further comprising:
   a modulation module configured to:
   identify the one or more signal sequences,
   map at least a portion of the one or more signal sequences to one of the multiple combinations of the multiple transmitting antennae, in accordance with the predetermined mapping table,
   map other portions of the one or more signal sequences to one or more modulation symbols, in accordance with the predetermined mapping table, and
   activate the one of the multiple combinations of the multiple transmitting antennae to transmit the one or more modulation symbols.

14. A non-transitory computer-readable medium that stores executable-instructions that, when executed, cause one or more processors to perform operations comprising:
   generating multiple groups of symbols that respectively corresponds to one of multiple combinations of one or more transmitting antennae based on respective wireless channel conditions and one or more wireless signals;
   calculating a distance value for each of the multiple groups of symbols;
   selecting, from the multiple groups of symbols, a group of symbols having the lowest calculated distance value; and
   generating one or more signal sequences based on the selected group of symbols in accordance with a predetermined mapping table.

15. The non-transitory computer-readable medium of claim 14, the operations further comprising:
   receiving the one or more wireless signals via one or more receiving antennae.

16. The non-transitory computer-readable medium of claim 14, wherein the calculated distance value for each of the multiple groups of symbols is a Euclidean distance value.

17. The non-transitory computer-readable medium of claim 14, further comprising:
   identifying the one or more signal sequences;
   mapping at least a portion of each of the one or more signal sequences to one of the multiple combinations of the one or more transmitting antennae in accordance with the predetermined mapping table;
   mapping other portions of each of the one or more signal sequences to one or more modulation symbols in accordance with the predetermined mapping table; and
   transmitting the one or more modulation symbols via the mapped one of the multiple combinations of the one or more transmitting antennae.

18. The non-transitory computer-readable medium of claim 14, wherein each of the symbols is generated as a matrix in accordance with a count of transmitting antennae in each of the multiple combinations of the one or more transmitting antennae.

19. The non-transitory computer-readable medium of claim 14, wherein the respective wireless channel conditions include a noise interference of the respective wireless communication channel.

20. The non-transitory computer-readable medium of claim 14, wherein the multiple combinations of the one or more transmitting antennae are included in a subset of a plurality of combinations of the one or more transmitting antennae.

\* \* \* \* \*

UNITED STATES PATENT AND TRADEMARK OFFICE
CERTIFICATE OF CORRECTION

PATENT NO. : 9,787,381 B2  Page 1 of 1
APPLICATION NO. : 15/296206
DATED : October 10, 2017
INVENTOR(S) : Xiao et al.

It is certified that error appears in the above-identified patent and that said Letters Patent is hereby corrected as shown below:

In the Specification

In Column 1, Line 7, delete "application Ser. No. 14/390,629," and insert -- application No. 14/390,629, --, therefor.

In Column 4, Line 31, delete "110A and 110B" and insert -- 110A and 110D --, therefor.

In Column 5, Line 59, delete "antennae 112,I" and insert -- antennae 112, I --, therefor.

In Column 6, Line 22, delete "µy-H$\tilde{x}^k$∥," and insert -- ∥y-H$\tilde{x}^k$∥, --, therefor.

Signed and Sealed this
Twenty-ninth Day of May, 2018

Andrei Iancu
*Director of the United States Patent and Trademark Office*